United States Patent
Kunimune

(10) Patent No.: US 7,309,991 B2
(45) Date of Patent: Dec. 18, 2007

(54) SCANNING PROBE INSPECTION APPARATUS

(75) Inventor: Yorinobu Kunimune, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 0 days.

(21) Appl. No.: 10/559,773

(22) PCT Filed: Sep. 29, 2003

(86) PCT No.: PCT/JP03/12389

§ 371 (c)(1), (2), (4) Date: Dec. 7, 2005

(87) PCT Pub. No.: WO2005/015188

PCT Pub. Date: Feb. 17, 2005

(65) Prior Publication Data

US 2006/0119373 A1    Jun. 8, 2006

(30) Foreign Application Priority Data

Aug. 7, 2003  (JP) .............................. 2003-289031

(51) Int. Cl.
*G01R 31/02* (2006.01)
*G01R 31/26* (2006.01)
*G01R 31/28* (2006.01)

(52) U.S. Cl. ...................... 324/354; 324/761; 324/765; 324/715; 250/306

(58) Field of Classification Search ......... 324/754–765
See application file for complete search history.

(56) References Cited

U.S. PATENT DOCUMENTS

| 5,214,389 A | * | 5/1993 | Cao et al. ................... 324/719 |
| 6,198,300 B1 | | 3/2001 | Doezema et al. |
| 6,403,389 B1 | * | 6/2002 | Chang et al. ................. 438/18 |
| 2003/0062915 A1 | * | 4/2003 | Arnold et al. ............... 324/762 |
| 2003/0197522 A1 | * | 10/2003 | Hamamura et al. ......... 324/765 |
| 2004/0100293 A1 | * | 5/2004 | Bottcher et al. ............ 324/754 |
| 2005/0269035 A1 | * | 12/2005 | Kawakami et al. ......... 156/598 |

FOREIGN PATENT DOCUMENTS

| EP | 0 309 236 | 3/1989 |
| JP | 2002-76076 | 3/2002 |
| JP | 2002-214112 | 7/2002 |

\* cited by examiner

*Primary Examiner*—Ha Tran Nguyen
*Assistant Examiner*—Emily Y Chan
(74) *Attorney, Agent, or Firm*—Young & Thompson

(57) ABSTRACT

A pair of pads is formed on an insulating layer formed on a top surface of a substrate, and a plurality of through-holes is laid out at equal intervals between the pads. Adjoining through holes are connected alternately by upper-layer wire interconnect lines exposed on the insulating layer or lower-layer wire interconnect lines buried in the insulating layer, thus constituting a check pattern. A DC power supply is connected between the pair of pads, and a constant current is supplied to a chain pattern of the through holes. Two probes move on a chip surface along the chain pattern of the through holes while keeping a given interval spacing. The probes sequentially scan the upper-layer wire interconnect lines exposed through the chip surface of the chain pattern of the through-holes.

12 Claims, 4 Drawing Sheets

SCANNING PROBE INSPECTION APPARATUS

This application is a national stage application under 35 USC 371 of PCT/JP03/12389, filed on Sep. 29, 2003.

TECHNICAL FIELD

The present invention relates to a scanning probe inspection apparatus, and particularly to a scanning probe apparatus for detecting defects in passive elements such as through-holes during process steps for manufacturing of semiconductor device.

BACKGROUND ART

In order to detect anomalies in the formation of through-holes (hereinafter, throughout this specification, the term "through-hole" means a set of a through-hole and a conductive material formed within the through-hole) etc., during the manufacture of semiconductor device, a check pattern, separate from a real device, for detecting defects created in the through holes is formed on individual chips on a wafer and then is measured as to what resistance the through-holes have to identify the presence or absence of defects in the through-holes and the locations thereof.

FIG. 5 is a schematic diagram showing a conventional scanning probe inspection apparatus (called a scan type probe microscope too) for detection of anomalies in the formation of through-holes. A plurality of through-holes 2 are arranged at equal intervals between a pair of pads 1 having dimensions on the order of 100.times.100 μm and formed on an insulating layer on the top surface of a substrate. Furthermore, those through-holes are connected to upper and lower interconnect lines such that except for the upper interconnect lines directly coupled to the pads 1, one upper interconnect line is coupled to an upper end of one through-hole out of adjacent through-holes and one lower interconnect line partially facing the one upper interconnect line is coupled to a lower end of one through-hole out of adjacent through-holes, and the one lower interconnect line is coupled to a lower end of the other through-hole out of adjacent through-holes, thereby forming a chain unit, and further, a plurality of chain units are coupled to one another in series to form a chain pattern (check pattern). In this case, the lower interconnect lines are embedded in the insulating film on the surface of the substrate. Thus, a chain-like check pattern is formed in which the plurality of through-holes 2 are connected in series through the upper and lower interconnect lines 4, 3 and the pads 1 are connected to both ends of the check pattern. It should be noted that the check pattern generally includes a significantly large number (in the figure, only eight pieces of through-holes are illustrated for simplification) of through-holes, for example, 10,000 pieces of through-holes. In this case, a chain unit consisting of a pair of through-holes 2, a lower interconnect line 3 coupling together the pair of through-holes 2, and an upper interconnect line 4 coupled to an upper end of one of the pair of through-holes 2 is repeatedly formed to construct chain units that have a pitch of typically not greater than 1 μm. The individual through-holes are normally formed to have a resistance of about 1 ohm and therefore, the check pattern (including 10,000 through-holes) is formed to have the designed resistance, i.e., 10 kilo-ohms between both ends of the pattern.

In the conventional scanning probe inspection apparatus, a DC power supply 5 (for supplying a DC voltage V0) is connected between one pad 1 (hereinafter called a reference pad) out of a pair of pads and a conductive probe 6, and then, the probe 6 operates so that the probe 6 begins moving from the upper interconnect line 4 on the side of the reference pad 1 to which the supply is connected and continue moving over the surface of a substrate in a sliding fashion in a direction in which the probe is apart from the reference pad 1. During scanning of the probe 6, current I flowing through a detection circuit constituted by the probe 6 and the DC power supply connected to the probe is measured. In this case, during movement of the probe 6, predetermined current is detected while the probe 6 is in contact with the upper interconnect line 4 and no current is detected while the probe 6 is sliding on the surface of the insulating layer on the substrate because the detection circuit is open. Therefore, the current I flowing through the detection circuit changes pulsewise as the probe moves. As the probe 6 moves away from the reference pad 1, the number of the through holes 2 between the probe 6 and the reference pad 1 increases, and the resistance therebetween thus increases, causing the current I flowing through the detection circuit to become smaller. As mentioned above, the resistance of one through hole 2 is normally about 1 ohm. Therefore, all the series-connected 10,000 through-holes included in the detection circuit have an overall resistance, 10 kilo-ohms, i.e., the resistance of the check pattern when the probe 6 is positioned farthest from the reference pad 1. At this point, assume that the check pattern that has a resistance of 10 kilo-ohms when the pattern contains no defective through-hole is measured as having a resistance of 20 kilo-ohms. In this case, two events are considered to have occurred. That is, the individual through-holes are uniformly formed to have a resistance of 2 ohms and any one of the through-holes is formed defective to have a resistance of 10 kilo-ohms, which is added to the resistance of other normal through-holes. In the former case, all the through holes are defective, eliminating necessity of identification of defective through-hole. In the latter case, when the probe 6 is moved and located on the upper interconnect line 4 that is connected to this defective through-hole 2, the resistance measured becomes enlarged while current measured largely decreases. Accordingly, detecting enlargement of the resistance allows identification of defective through-hole. Note that the check pattern actually is formed to have a plurality of arrangements of through-holes connected together in rows and the probe scans over the plurality of arrangements of through-holes two-dimensionally. After identification of the defective through-hole, the corresponding portion is cut and the cross section of the portion is observed by a transmission electron microscopy or the like, and an anomaly in the profile of the cross section is detected to determine what causes the defect. The results obtained by the detection are fed back to the fabrication process for a semiconductor device to suppress the occurrence of defects.

A conventional scanning probe microscope has been proposed in which two or more electrically independent probes are constituted by carbon nano tubes and scan minute materials of not greater than 100 nm, allowing measurement of electrical characteristics (Japanese Patent Laid-Open No. 2002-214112).

Further, as a method of detecting anomalies in the formation of through-holes, a scheme called OBIRCH (Optical Beam Induced Resistance Change) is proposed. According to this scheme, a laser beam scans over and is irradiated onto a through hole pattern, and heat from the laser beam is absorbed by a void at the location of a defective through-hole, and then, change in current is detected, allowing identification of the defective through-hole.

However, the conventional techniques include the following problems. That is, in a case where the resistance of a defective through-hole is high, it is possible to detect and identify the defective through-hole. However, in a case where the resistance thereof is low, it is not possible to detect the defective through-hole, meaning that the sensitivity with which the defective through-hole is detected is low. There exists a contact resistance between the probe 6 and the upper interconnect line 4. Therefore, while the probe 6 scans, fluctuation of the current detected, due to change in contact resistance, is observed.

As such, in a case where the resistance of the defective through-hole is low, even when the probe reaches the location of the defective through-hole and the current detected changes stepwise, this change is not detectable due to variations in contact resistance and whether the through-hole is defective cannot be detected.

The contact resistance is typically as large as over 1 kilo-ohms and when the resistance of a defective through-hole is relatively low, e. g., 10 ohms to 1 kilo-ohms, the defective through-hole cannot be detected due to change (variations) in contact resistance during probe scanning.

The method described in Japanese Patent Laid-Open No. 2002-214112 needs to use a carbon nano tube and has a shortcoming of having high cost of detection. Furthermore, the diameter of laser beam is greater than that of through-hole in the OBIRCH scheme and therefore, a defective through-hole cannot be identified.

DISCLOSURE OF INVENTION

The present invention has been conceived in consideration of the problems to provide a scanning probe inspection apparatus that has a low detection cost and ability to detect even an abnormality in a resistance value as low as about 10 ohms and identify a location of a defective through-hole.

A scanning probe inspection apparatus according to the present invention detects anomalies in a passive element out of a plurality of passive elements connected together to form a chain pattern intermittently exposing portions of said chain pattern to a surface of a chip. The scanning probe inspection apparatus comprises: a bias voltage supplier for applying a bias voltage between both ends of said chain pattern; two probes arranged at a spacing determined by a distance between said exposed portions of said pattern; a detector for detecting a potential difference between said two probes; and a scan section provided to cause said two probes to scan over a surface of a wafer containing said chip while keeping unchanged said spacing between said two probes.

Said plurality of passive elements are, for example, arranged at a given pitch and said two probes are spaced from each other a distance equal to or greater than twice said given pitch of said plurality of passive elements.

Said passive elements may be through-holes and said through holes may be coupled to one another such that one upper interconnect line is coupled to an upper end of one through-hole out of adjacent through-holes and one lower interconnect line is coupled to a lower end of said one through-hole out of adjacent through-holes and a lower end of the other through-hole out of adjacent through-holes, thereby forming a chain unit including said one upper interconnect line, said adjacent through-holes and said one lower interconnect line, and further, a plurality of chain units may be coupled in series, and wherein said probes may contact upper interconnect lines including said one upper interconnect line.

It may be constructed as that said probe has a thin plate shaped base portion, a lever extending from said base portion and a needle formed at a distal end of said lever, wherein said base portion, lever and needle are formed by processing one of a semiconductor and a metal material.

In this case, said needle may be so formed as to be inclined from said distal end of said lever in a direction that said distal end points.

Also, said probe can be formed by coating a surface of silicon with a conductive material.

Said conductive material is, for example, boron-doped diamond.

EFFECT OF THE INVENTION

According to the present invention, a bias voltage is applied between both ends of a chain pattern by the bias voltage application section to let a given current Io flow, two probes with a given spacing maintained are moved to scan a portion in the chain pattern which is exposed on the top surface of a wafer, and a potential difference V between the two probes is detected by the detector, so that the potential difference V between those points of the chain pattern at which the two probes contact can be measured without influencing the contact resistance between the probes and the chain pattern. Therefore, a resistance R which is grasped as V/Io becomes the resistance of the chain pattern itself which is not influenced by the contact resistance. In case where there is an abnormality in a passive element, such as a through hole, and its resistance is greater than the resistance of the normal passive element, therefore, it can be detected reliably and the defective passive element can be specified. In case where the passive elements are through holes, for example, the resistance of a normal through hole is about 1 W but it is possible to detect a defective through hole whose resistance is as low as 10 W to 1 kW.

BEST MODE FOR CARRYING OUT THE INVENTION

Figure 1:
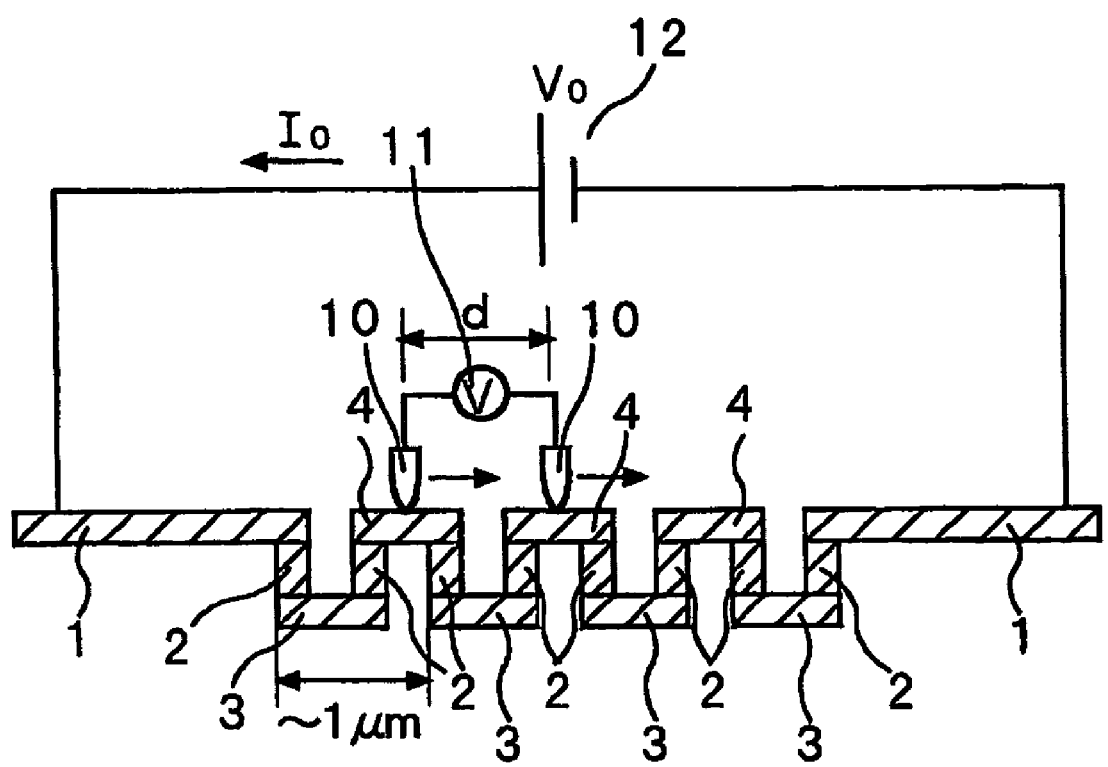
FIG. 1 is an exemplary diagram showing a scanning probe inspection apparatus according to one embodiment of the present invention.
Figure 5:
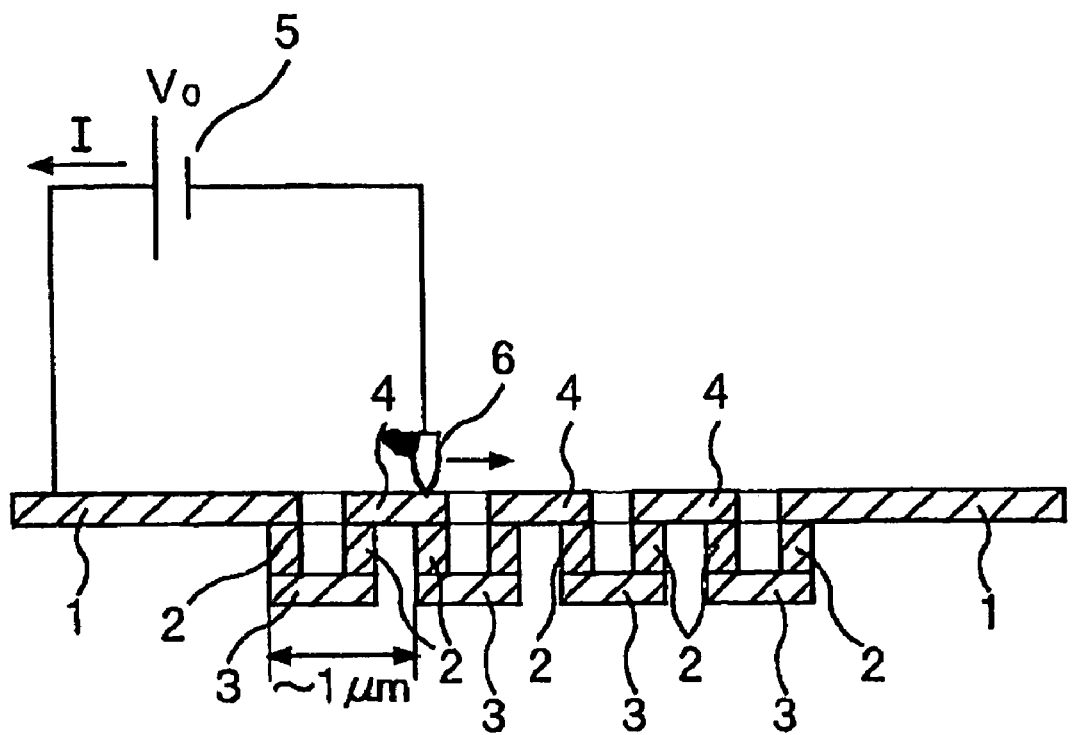
FIG. 5 is an exemplary diagram showing a conventional scanning probe inspection apparatus.

An embodiment of the present invention will be described below with reference to the accompanying drawings. FIG. 1 is an exemplary diagram showing one embodiment of the invention. Same reference numerals are given to those constituents which are the same as those in FIG. 5 and detailed description thereof is omitted. A check pattern is a chain pattern of through-holes 2 as in FIG. 5 and a pair of pads 1 are formed on an insulating layer formed on a surface of a substrate, and a plurality of through-holes 2 are arranged at equal intervals between the pads 1. Those through-holes 2 are connected to upper and lower interconnect lines such that except for the upper interconnect lines directly coupled to the pads 1, one upper interconnect line is coupled to an upper end of one through-hole out of adjacent through-holes and one lower interconnect line partially facing the one upper interconnect line is coupled to a lower end of one through-hole out of adjacent through-holes, and the one lower interconnect line is coupled to a lower end of the other through-hole out of adjacent through-holes, thereby forming a chain unit, and further, a plurality of chain units are coupled to one another in series to form a chain pattern (check pattern). In this case, the lower interconnect lines are embedded in the insulating film on the surface of the substrate. Thus, a chain-like check pattern is formed in which the plurality of through-holes 2 are connected in series through the upper and lower interconnect lines 4, 3 and the pads 1 are connected to both ends of the check pattern.

In the embodiment, a DC power supply 12 is connected between the pair of pads 1 and constant current Io flows through the chain pattern of the through holes 2. Furthermore, two probes 10 are arranged at a given spacing d and can move on a chip surface along the chain pattern of the through holes 2 while keeping the given spacing d. Thus, the probes 10 sequentially scan the upper interconnect lines 4 provided in the chain pattern of the through holes 2 and exposed through the chip surface.

As described above, a repetitive pattern of chain units comprised of a pair of through holes 2, a lower interconnect line 3 connecting together adjacent through-holes 2 and an upper interconnect line 4 connected to the upper end of one through-hole 2 is typically formed to have the chain units disposed, for example, at a pitch of 1 μm or less. In this case, the spacing d of the probes 10 is the same as that of the chain units. That is, the spacing d of the probes 10 is twice the pitch of the through holes 2. A voltmeter 11 is connected between the probes 10 to detect a potential difference V between points at which the upper interconnect lines and the probes 10 contact each other.

Next, the operation of the above-described scanning probe inspection apparatus for inspection of semiconductor wafers (or substrates) according to the embodiment will be explained below. A DC voltage is applied between the pads 1 to cause current Io to flow through the chain pattern (check pattern) of the through-holes 2. It is to be noted that instead of the DC voltage, an AC voltage may be applied between the pads 1 to cause AC current Io to flow through the chain pattern (check pattern) of the through-holes 2. When an AC voltage is used to bias the chain pattern of the through-holes 2 and the AC voltage is detected by the probes 10, 1/F noise can advantageously be reduced to a larger extent compared to the case of using the DC voltage, increasing the detection sensitivity. Thereafter, while the spacing d is maintained, the pair of probes 10 scan, for example, rightward from the left end in FIG. 1. When the probes 10 are in contact with the surface of the insulating layer, the voltmeter 11 indicates an infinite value (i. e., indicating the resistance of the insulating layer), whereas when the probes 10 are in contact with the upper interconnect lines 4, the voltmeter 11 detects a potential difference between probe contact points in the chain pattern. Because the spacing d between the probes 10 is equal to the pitch of the repetitive chain units of the chain pattern, when one probe 10 is in contact with the upper interconnect line 4, the other probe 10 is also in contact with another upper interconnect line 4, and likewise, when one probe 10 is in contact with the surface of the insulating layer, the other probe 10 is also in contact with the surface of the insulating layer. Therefore, the result of the detection of the potential difference by the voltmeter 11 changes pulsewise as the probes 10 move.

In this case, since the internal resistance of the voltmeter 11 is sufficiently larger than the contact resistance between the probes 10 and the upper interconnect lines 4, the value that the voltmeter 11 detects is not substantially influenced by the contact resistance and the potential difference between the probe contact points in the chain pattern can be detected with high precision. Given that the detected potential difference between the probes 10 is V, the resistance R of the chain pattern between the probes 10 becomes R=V/Io and the resistance R of the chain pattern between the probe contact points can be detected with high precision. This resistance also changes pulsewise as the probes 10 move. Accordingly, when an anomaly, such as a void, is present in a certain through-hole, the resistance of the certain through-hole is detected higher than that of a normal through-hole, allowing detection of the presence of a defective through-hole. Furthermore, a defective through-hole can be identified such that the probes are moved to scan over the chain pattern and the resistance of the chain pattern is measured as a pulse pattern, and then, the pulse number corresponding to the location at which the resistance measured becomes maximum is detected.

Since the apparatus according to the invention is able to detect the resistance of a through-hole in a manner that is not influenced by the contact resistance of the probes, even a defective through-hole whose resistance differs from that of a normal through-hole merely by a factor of five can be detected with high accuracy, allowing identification of the location of the defective through-hole. That is, when the resistance of a normal through-hole is about 1 ohm (about 2 ohms per chain unit (two through-holes)), an anomaly indicating a resistance of about 10 ohms can be detected. Additionally, simply sliding the probes 10 over the surface of chip allows the resistance of the chain pattern to be measured as a pulse pattern (potential difference pattern) and then enables identification of defective through-hole, thus eliminating the need for a high-precision positioning and detecting apparatus for identification of the position of defective through-hole. Accordingly, even when the pitch of the through-holes is as small as 0.3 μm or less, it is possible to detect and identify a defective through-hole, meaning that the apparatus of the invention has a high spatial resolution of 0.3 μm or less.

Although the apparatus of the above-described embodiment has been explained as having the probes moved to scan one-dimensionally, actually in many cases, the apparatus has the probes 10 moved to scan two-dimensionally the check pattern of the chain units containing respectively a pair of through-holes and arranged two-dimensionally, and then, detects a defective through-hole two-dimensionally. When a defective through-hole is detected and the location thereof is identified in the above-described manner, the corresponding chip is cut at the position of that defective through-hole and the cross section of the defective through-hole is analyzed with a transmission electron microscopy. This allows to find the cause of a defect, such as an anomaly in the profile of the defective through-hole, and in turn, the finding of the cause permits acknowledgement of problems in the fabrication process, and then, improvement of the problematic process step serves to prevent the occurrence of defect.

Figure 2:
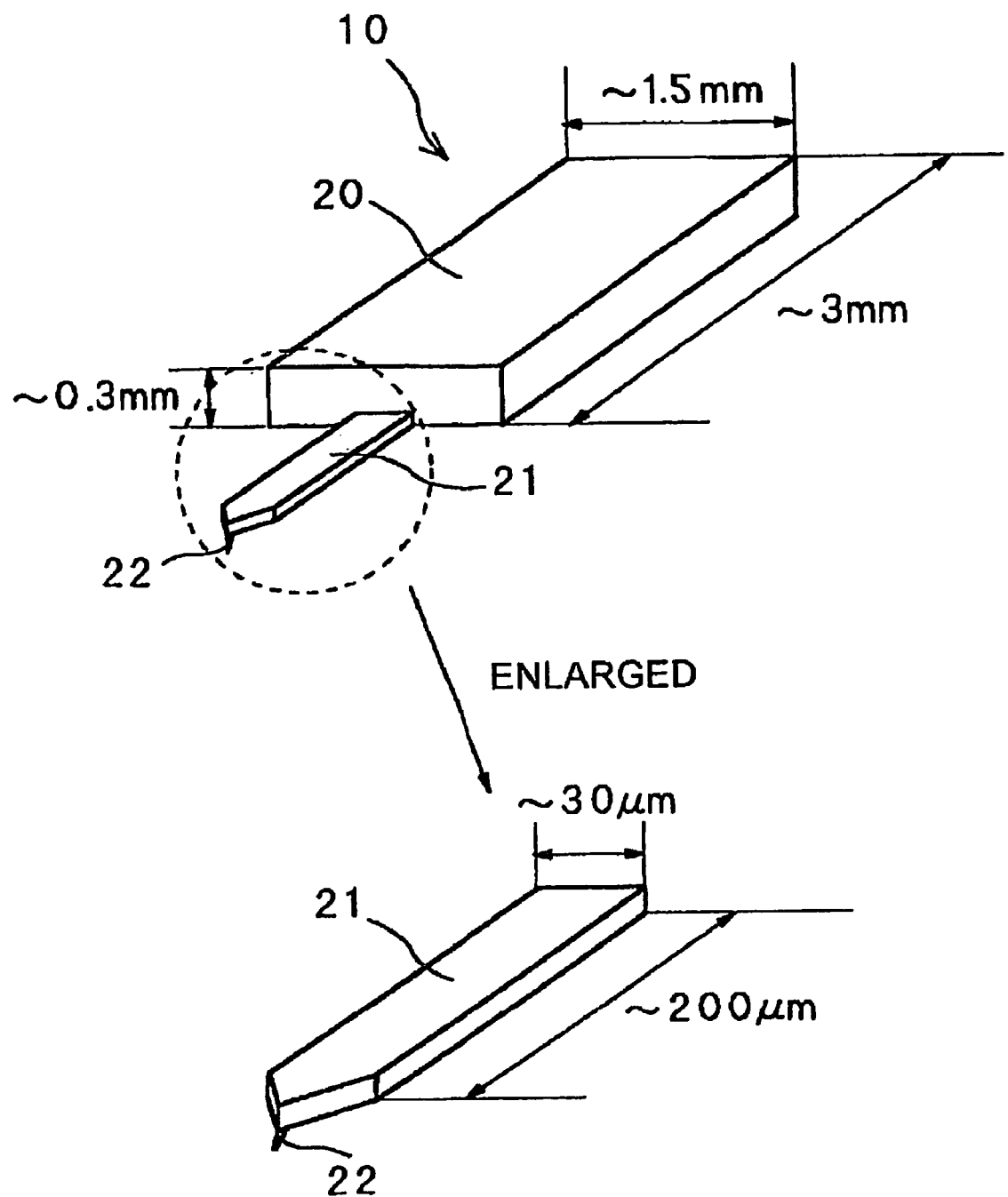
FIG. 2 is a diagram showing the structure of a probe.

Next, one example of the probe 10 will be discussed referring to FIG. 2. The probe 10 is configured as, for example, a cantilever in such a way that a lever 21 having a width of about 30 μm and length of about 200 μm is formed at the distal end of a thin plate 20, having a width of, for example, 1.5 mm and length of, for example, 3 mm and a thickness of, for example, 0.3 mm, so as to extend from the thin plate 20, and a needle 22 is formed at the distal end of the lever 21. The diameter of the distal end of the needle 22 is, for example, 100 nm. The needle 22 is so formed as to be inclined from the distal end of the lever 21 in a direction that the distal end of the lever 21 points.

Two pieces of such probes 10 are prepared and the thin plates 20 are disposed in such a way that the needles 22 face each other. In this case, the needle 22 is formed protruding from the distal end of the lever 21, so that the needle is inclined in the direction that the distal end of the lever 21 points, and therefore, it is possible to set a spacing between the distal ends of a pair of needles 22 as small as about 0.5 to 1 μm. Note that the spacing between the needles 22 of the probes 10 is determined by an interval at which the chain units of the chain pattern of the through holes 2 are repeated (e.g., 0.5 to 1 μm).

The probe 10 comprising the thin plate 20, the lever 21 and the needle 22 can be formed by processing a semiconductor or a metal material using microprocessing technology. That is, the probe 10 can be formed using a method including: forming a silicon film on the substrate; patterning the silicon film in the shape of probe using photolithography techniques; and removing the substrate and coating a conductive material on the surface of the silicon film. The conductive material would be a Pt-Ir alloy, CoCr alloy or the like. Although in the embodiment, the probe 10 is formed of silicon which is a semiconductor, the invention is not limited to employment of silicon but may employ metal such as tungsten that facilitates processing of metal.

Although the probe 10 can be formed in the shape of a cantilever made of silicon as mentioned above, the probe is preferably coated with boron doped diamond. In this case, diamond itself is semiconductive, however, becomes conductive when doped with boron. This boron-doped diamond layer has sharp projections and depressions on its surface. Therefore, while the probe 10 scans (slides), the sharp portions of the surface of the needle 22 of the probe 10 move scratching the upper interconnect lines 4. Note that the upper interconnect line 4 is normally formed of copper and the surface of the copper interconnect line is oxidized naturally, making it difficult to allow the probe to make an ohmic contact with the copper interconnect line. However, the needle 22 of the probe 10 having the surface coated with boron-doped diamond scans the copper interconnect line while scratching and removing the natural oxide film with the sharpened surface of the needles, and thus has an advantage that the probe easily makes an ohmic contact with the copper interconnect line.

Figure 3:
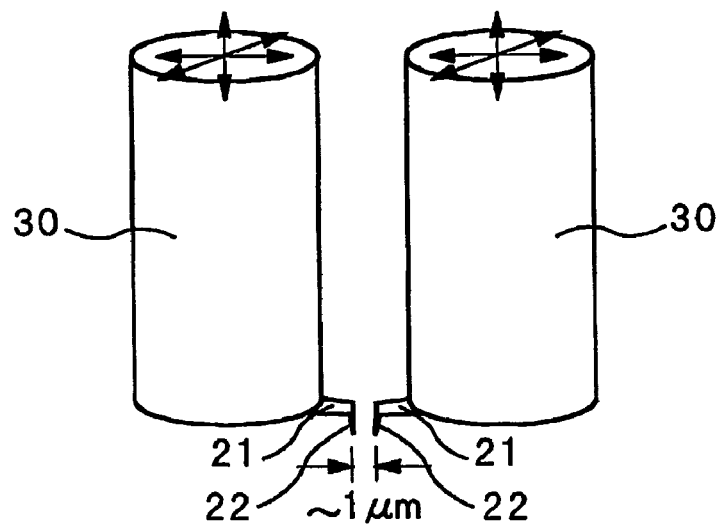
FIG. 3 is a diagram illustrating a drive method for the probe.

Next, how to drive the probe 10 will be described. FIG. 3 illustrates the cantilever-shaped probe 10 shown in FIG. 2 and fixed to the lower end of a columnar three-dimensional piezoscanner 30. This three-dimensional piezoscanner 30 is a piezoelectric element which, when applied with a voltage, contracts in the direction of voltage application, and can be contracted three-dimensionally by applying a voltage in directions (X direction and Y direction) parallel to the cross section of the columnar piezoscanner and in a direction (Z direction) of the axis of the columnar piezoscanner. Therefore, the probe 10 arranged at the lower end of the columnar piezoscanner can be moved three-dimensionally, i. e., in X, Y and Z directions.

The two three-dimensional piezoscanners 30 can independently control the positions of the two probes 10 and can scan an object by moving the probes 10 in one direction (the direction in which the chain units of the chain pattern are arranged) while keeping the spacing between the probes 10 constant. In a case where scanning is executed on a plane, the needles 22 of the probes 10 are disposed to face each other at a predetermined spacing by finely adjusting the positions of the probes 10 in the X and Y directions. Then, the two probes 10 are moved in the X direction or the Y direction while keeping the spacing. At this time, the probes 10 are configured to be able to move up and down in the Z direction along the projections and depressions on the surface of a sample to be measured. Detection and feedback of the projections and depressions on the surface of a sample to be measured is the most fundamental function of a scanning probe microscopy. For example, the scanning probe microscopy is configured so that the probe microscopy detects the projections and depressions on the surface of a sample to be measured using a scheme called an optical lever system or the like and feedbacks the information indicative of the projections and depressions to the movement of the piezoscanner 30 in the Z direction, thereby always keeping the contact pressure of the distal end of the probe constant relative to the surface of the sample. This allows the probes 10 to scan while maintaining constant the spacing between the probes 10. The scanning of the probes 10 can be executed two-dimensionally, i. e., in the X and Y directions.

Figure 4:
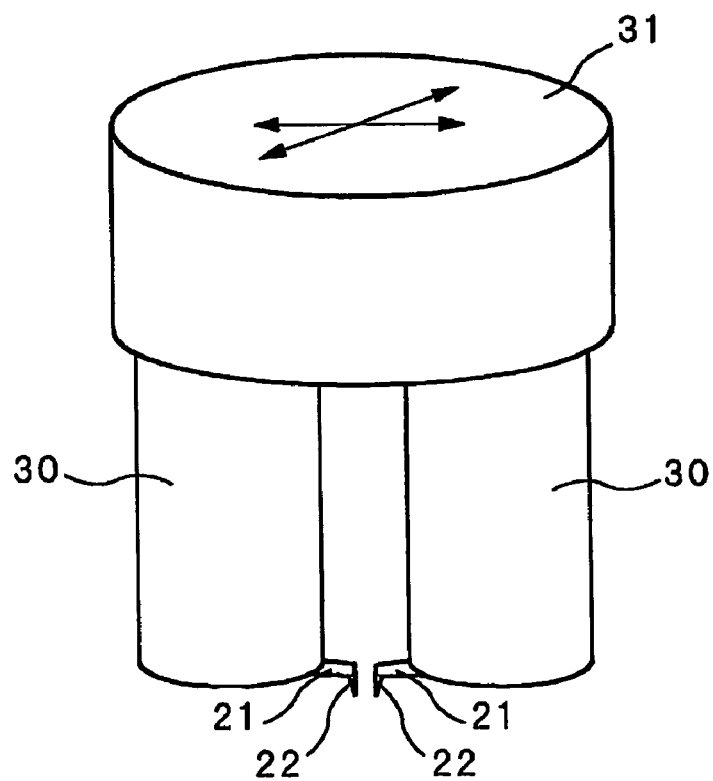
FIG. 4 is a diagram illustrating another embodiment of the drive method for the probe.

FIG. 4 is a diagram illustrating another embodiment of how the probe 10 is driven. An apparatus of the embodiment is configured such that the upper ends of the two three-dimensional piezoscanners 30 of FIG. 3 are connected to a two-dimensional piezoscanner 31 and the two three-dimensional piezoscanners 30 are supported by the single two-dimensional piezoscanner 31. The probes 10 are fixed to the lower ends of the three-dimensional piezoscanners 30. The two-dimensional piezoscanner 31 can be contracted in the X and Y directions.

In the embodiment, the needles 22 of the probes 10 can be disposed to face each other at a predetermined spacing (1 μm) by operating the three-dimensional piezoscanner 30 so that the positions of the probes 10 are finely adjusted in the X, Y, Z directions. The probes 10 scan so that the two-dimensional piezoscanner 31 is driven in the X and Y directions and the probes 10 are moved to scan in the X and Y directions while keeping constant the spacing therebetween. In the embodiment, the scanning of the probes 10 can be controlled by the single piezoscanner 31. At this time, the probes 10 are configured to be able to move up and down in the Z direction along the projections and depressions on the surface of a sample to be measured. As described above, detection and feedback of the projections and depressions on the surface of a sample to be measured is the most fundamental function of a scanning probe microscopy. Moreover, the scanning probe microscopy is configured so that the probe microscopy detects the projections and depressions on the surface of a sample to be measured and feedbacks the information indicative of the projections and depressions to the movement of the piezoscanner 30 in the Z direction, thereby always keeping the contact pressure of the distal end of the probe constant relative to the surface of the sample.

Needless to say, the apparatus of the invention is not limited to the above-described embodiments describing the configuration of the probe 10 and the method of how to drive the probes 10. Moreover, the passive elements to be detected as to whether the elements contain anomalies are not limited to through-holes of the above-described embodiments but would be, for example, contact holes and the electrodes of transistors arranged in an array.

The invention claimed is:

1. A scanning probe inspection apparatus for detecting anomalies in a passive element out of a plurality of passive elements connected together to form a chain pattern intermittently exposing portions of said chain pattern to a surface of a chip, the scanning probe inspection apparatus comprising:
a bias voltage supplier for applying a bias voltage between a pair of pads of said chain pattern;
two probes arranged at a spacing determined by a distance between said exposed portions inside of said pads;
a detector for detecting a potential difference between said two probes; and
a scan section provided to cause said two probes to scan over a surface of a wafer containing said chip while keeping unchanged said spacing between said two probes.

2. The scan type probe inspection apparatus according to claim 1, wherein said passive elements are through-holes and wherein said through holes are coupled to one another such that one upper interconnect line is coupled to an upper end of one through-hole out of adjacent through-holes and one lower interconnect line is coupled to a lower end of said one through-hole out of adjacent through-holes and a lower end of the other through-hole out of adjacent through-holes, thereby forming a chain unit including said one upper interconnect line, said adjacent through-holes and said one lower interconnect line, and further, a plurality of chain units are coupled in series, and wherein said probes contact upper interconnect lines including said one upper interconnect line.

3. The scanning probe inspection apparatus according to claim 1, wherein said probe has a thin plate shaped base portion, a lever extending from said base portion and a needle formed at a distal end of said lever, wherein said base portion, lever and needle are formed by processing one of a semiconductor and a metal material.

4. The scanning probe inspection apparatus according to claim 3, wherein said probe is formed by coating a surface of silicon with a conductive material.

5. The scanning probe inspection apparatus according to claim 4, wherein said conductive material is boron-doped diamond.

6. A scanning probe inspection apparatus for detecting anomalies in a passive element out of a plurality of passive elements connected together to form a chain pattern intermittently exposing portions of said chain pattern to a surface of a chip, the scanning probe inspection apparatus comprising:
a bias voltage supplier for applying a bias voltage between both ends of said chain pattern;
two probes arranged at a spacing determined by a distance between said exposed portions of said pattern;
a detector for detecting a potential difference between said two probes; and
a scan section provided to cause said two probes to scan over a surface of a wafer containing said chip while keeping unchanged said spacing between said two probes,
wherein said probe has a thin plate shaped base portion, a lever extending from said base portion and a needle formed at a distal end of said lever, wherein said base portion, lever and needle are formed by processing one of a semiconductor and a metal material, and
wherein said needle is so formed as to be inclined from said distal end of said lever in a direction that said distal end points.

7. A scanning probe inspection apparatus for detecting anomalies in a passive element out of a plurality of passive elements connected together to form a chain pattern intermittently exposing portions of said chain pattern to a surface of a chip, the scanning probe inspection apparatus comprising:
a bias voltage supplier for applying a bias voltage between a pair of pads of said chain pattern;
two probes arranged at a spacing determined by a distance between said exposed portions inside of said pads;
a detector for detecting a potential difference between said two probes; and
a scan section provided to cause said two probes to scan over a surface of a wafer containing said chip while keeping unchanged said spacing between said two probes,
wherein said plurality of passive elements are arranged at a given pitch and said two probes are spaced from each other a distance equal to or greater than twice said given pitch of said plurality of passive elements.

8. The scan type probe inspection apparatus according to claim 7, wherein said passive elements are through-holes and wherein said through holes are coupled to one another such that one upper interconnect line is coupled to an upper end of one through-hole out of adjacent through-holes and one lower interconnect line is coupled to a lower end of said one through-hole out of adjacent through-holes and a lower end of the other through-hole out of adjacent through-holes, thereby forming a chain unit including said one upper interconnect line, said adjacent through-holes and said one lower interconnect line, and further, a plurality of chain units are coupled in series, and wherein said probes contact upper interconnect lines including said one upper interconnect line.

9. The scanning probe inspection apparatus according to claim 7, wherein said probe has a thin plate shaped base portion, a lever extending from said base portion and a needle formed at a distal end of said lever, wherein said base portion, lever and needle are formed by processing one of a semiconductor and a metal material.

10. The scanning probe inspection apparatus according to claim 9, wherein said needle is so formed as to be inclined from said distal end of said lever in a direction that said distal end points.

11. The scanning probe inspection apparatus according to claim 7, wherein said probe is formed by coating a surface of silicon with a conductive material.

12. The scanning probe inspection apparatus according to claim 7, wherein said conductive material is boron-doped diamond.

* * * * *